United States Patent
Rowland et al.

[19]

[11] Patent Number: 5,890,617
[45] Date of Patent: Apr. 6, 1999

[54] SWING-AWAY TRAILER HITCH/COUPLER

[76] Inventors: Edward Ralph Rowland, 7176 Sonoma Ave.; Thomas William Hunsucker, 7166 Sonoma Ave., both of Alta Loma, Calif. 91701

[21] Appl. No.: 743,508

[22] Filed: Nov. 4, 1996

[51] Int. Cl.$^6$ .................................................. B60D 1/155
[52] U.S. Cl. ................................. 280/491.3; 280/479.2; 213/188
[58] Field of Search ................................. 280/504, 491.1, 280/462, 461.1, 478.1, 474, 477, 479.3, 488, 491.3, 491.4, 492, 493, 498, 499, 507, 479.2; 213/188, 194

[56] References Cited

U.S. PATENT DOCUMENTS

| | | | |
|---|---|---|---|
| 4,398,742 | 8/1983 | Sanders | 280/491.3 |
| 5,011,176 | 4/1991 | Eppinette | 280/479.3 |
| 5,147,095 | 9/1992 | Duncan | 280/491.4 |
| 5,226,657 | 7/1993 | Dolphin | 280/478.1 |
| 5,308,100 | 5/1994 | Heider et al. | 280/474 |
| 5,503,423 | 4/1996 | Roberts et al. | 280/491.3 |

*Primary Examiner*—Robert J. Oberleitner
*Assistant Examiner*—Pamela J. Lipka

[57] ABSTRACT

This invention pertains to a swing-away hitch for trailers, in particular the boat trailer market. Boat trailers are longer than the boats itself for towing purposes. When having to store the boat and trailer in a small space, the tongue with the hitch of the trailer becomes an obstacle. This invention allows a trailer to be parked in spaces that could only hold the size of the boat by swinging the hitch to the side. The design of this invention consists of sandwiching a tube (tongue of the trailer) between two plates with holes that align with tubular sleeves welded on opposite sides at the end of a hitch cover to convert it to a swing-away hitch. Pins are inserted to mount the swing-away hitch onto the swing-away hitch assembly. In a towing position, both pins stay in their sleeves. In a stowaway position, one pin is removed and the swing-away hitch swivels via the remaining pin away to the side of the trailer.

1 Claim, 4 Drawing Sheets

SWING-AWAY TRAILER HITCH/COUPLER

FIELD OF INVENTION

This invention pertains to the hitch assembly for trailers, in particular the boat trailer market, wherein the hitch can be rotated or swung- away allowing for easy storage by reducing the overall storage size of the trailer.

RELATED APPLICATIONS

| 5,503,423 | 4-2-96  | ROBERTS | 280/491.3 |
|-----------|---------|---------|-----------|
| 4,398,742 | 8-16-83 | SANDERS | 280/491.3 |

BACKGROUND OF INVENTION

Most garages are only 23 feet in length, but the usable space is less than that. Many customers when buying a boat sometimes must sacrifice and buy a smaller boat to ensure that it fits in the garage since the trailer is always larger than the boat for towing purposes. Customers have been known to take drastic and expensive measures such as enlarging their garage space so their expensive investment could be stored indoors. Some are even forced to buy a smaller boat.

One popular option to shorten a trailer's length in the tongue area is called a pull-out tongue. It is a sleeved-design consisting of a male hitch and female tongue; the male hitch slides into the female tongue of the trailer. The two are held together by one or two pins depending on the design. This design has several disadvantages of which includes the cumbersome lifting of a heavy object, the male and female fit will get sloppy over time, and when a brake coupler is included in the design, brake failure may occur because a quick disconnect fitting is used. The quick disconnects may allow dirt particles and air to enter the brake line every time it is disconnected.

The patent to Roberts discloses a tubular hitch sandwiched between top and bottom plates. Holes throught the hitch and the plates are aligned with one another and the tubular casing is inserted through the holes. Thereafter, the ends of the tubular casings are "swedged" or expanded by pressing bullet shaped pins into opposite ends of the casings. The swedging effect securely fastens the components. Finally, pins are inserted through the casings to mount the swing away hitch on the trailer.

The patent to Sanders discloses a tongue or drawbar of a boat trailer severed intermediate its ends; and the cut ends are then releasably hinged together by a pair of spaced, parallel hinge pins, either of which can be withdrawn to permit the forward end of the drawbar to be swung about the remaining pin, and rearwardly into an inactive position which effectively shortens the overall length of the drawbar, so that the associated trailer can be readily stored in a conventional garage. The hinge mechanism comprises a pair of tubular members designed to be slid over the cut ends of the drawbar, and then to be bolted and/or welded to the associated drawbar section. Confronting ends of the hinge members have thereon two sets of cooperating hinge barrels, which releasably support the two hinge pins about spaced, vertical axes adjacent opposite sides, respectively, of the drawbar.

All of the systems mentioned above have in one way or another benefits and flaws. There is still a need for a swing away system that is easy to operate, build, and just as important, aesthetically pleasing to the eye.

SUMMARY OF INVENTION

In summary, it is the object of this invention for trailers to offer a swing-away hitch that is easy to rotate to maximize storage capabilities, simple to build, asthetically pleasing and at the same time, offer the strength and durability required for transport.

The hitch assembly of the present invention is mounted to the base of the tongue of the the trailer or at the apex where the two frame rails meet. At this point, the tongue is sandwiched by two support plates with holes that are vertically aligned to each other. The pivoting arm is formed by welding two tubular sleeves vertically, that are parallel and are on opposite sides at the end of the actuator cover. Specially formed support gussetts are welded to the tube and cover for strength and asthetics. The pivoting arm is received between the two support plates where the corresponding holes of the plates are aligned with the tubular sleeves. Pins are inserted to lock the pivoting arm in place. One pin acts as the pivot point while the other is the release. By releasing a pin, the other pin acts as a hinge and rotates the hitch into the folded position next to the frame rail of the trailer. Pin placements are interchangable allowing rotation of the swing-away hitch to rotate to either side.

DETAILED DESCRIPTION OF INVENTION

Figure 1:
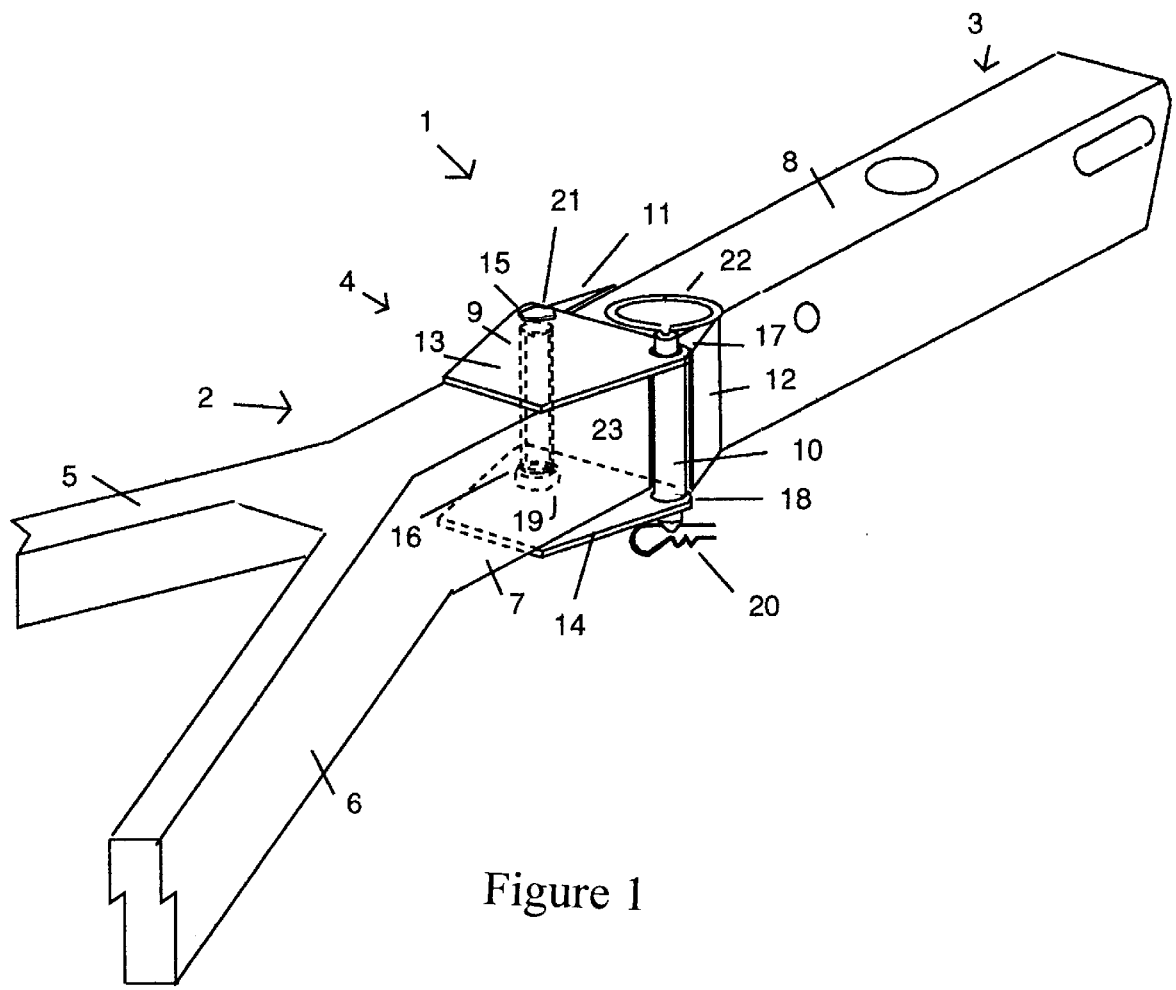
FIG. 1 Illustrates a perspective view of the swing-away hitch mounted to the tongue of a trailer in a towing position.

FIG. 1 illustrates the present invention designated by the numeral 1 including the front sectional of a trailer 2, and a swing-away tongue 3 mounted to swing-away hitch assembly 4. The trailer section 2 is constructed in an A shape with side supports 5, 6 meeting at an apex and rigidly attached to the main tongue of the trailer 7. The side supports can be constructed with either a rigid material of tube or channel made of steel, aluminum or the like.

The swing-away hitch assembly 4 consists of two outer support plates 13, 14 which are mounted by welding or the like on top and bottom and extended beyond the main trailer tongue 5. The trapezoidal plates are made from a rigid flatbar. A hole is placed at each corner of the widest point of the plate (see FIG. 2). The corners of the plates are rounded for safety and match the radius of the holes. The top plate 13 holes 15, 17 align vertically with holes 16, 18 of the bottom plate 14.

The swing-away hitch 3 consists of an actuator cover 8 modified by welding tubular sleeves 9, 10 on opposite sides, flushed with the rear of the cover. Formed gussets 11, 12 are welded to the tubes 9, 10 and cover 8 for support and asthetics. Within the actuator cover would lie an actuator/ coupler that would attach itself to the tow vehicle (not shown).

The swing-away hitch 3 is sandwiched between the plates 13, 14 with the tubes 9, 10 aligning themselves vertically with the holes of the plates 15, 16, 17, 18. Tube 9 would align with holes 15, 16 and receives a pivot pin 21. A washer 23 resides between tube 9 and plate 14 acting as a shim allowing the swing-away hitch to be rotated without rubbing against plate 14. Hole 17, tube 10 and hole 18 receives a positioning pin 22 secured by a cotter pin 20 for quick releasability.

Figure 2:
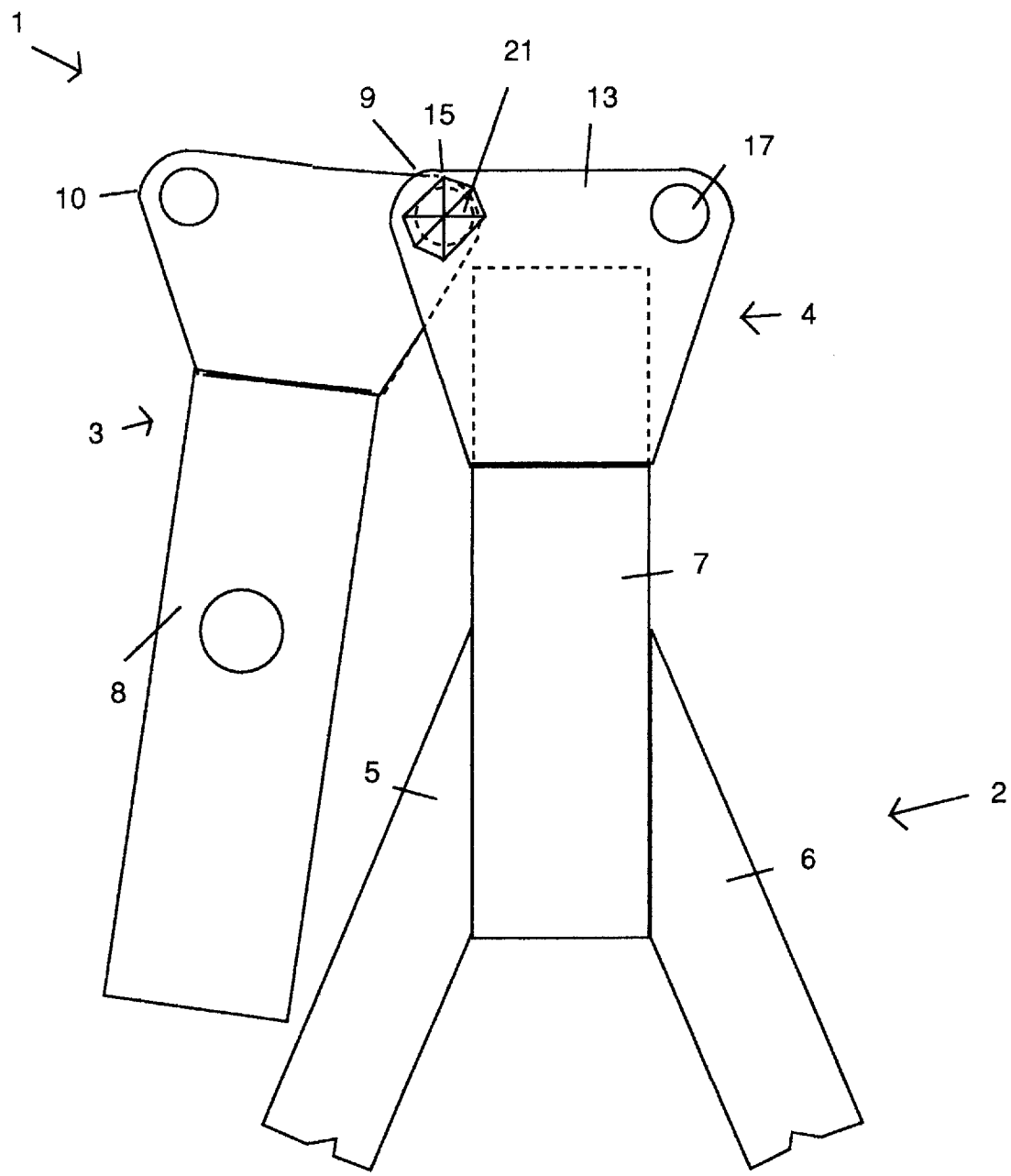
FIG. 2 Illustrates a top planar view of the invention with the swing-away hitch rotated to the storage position.

FIG. 2 consists of a planar view of the invention in a storage mode. Once the positioning pin (not shown) has been released. The swing-away hitch 3 pivots via the pivoting pin 21 and rotates to the rear.

Figure 3:
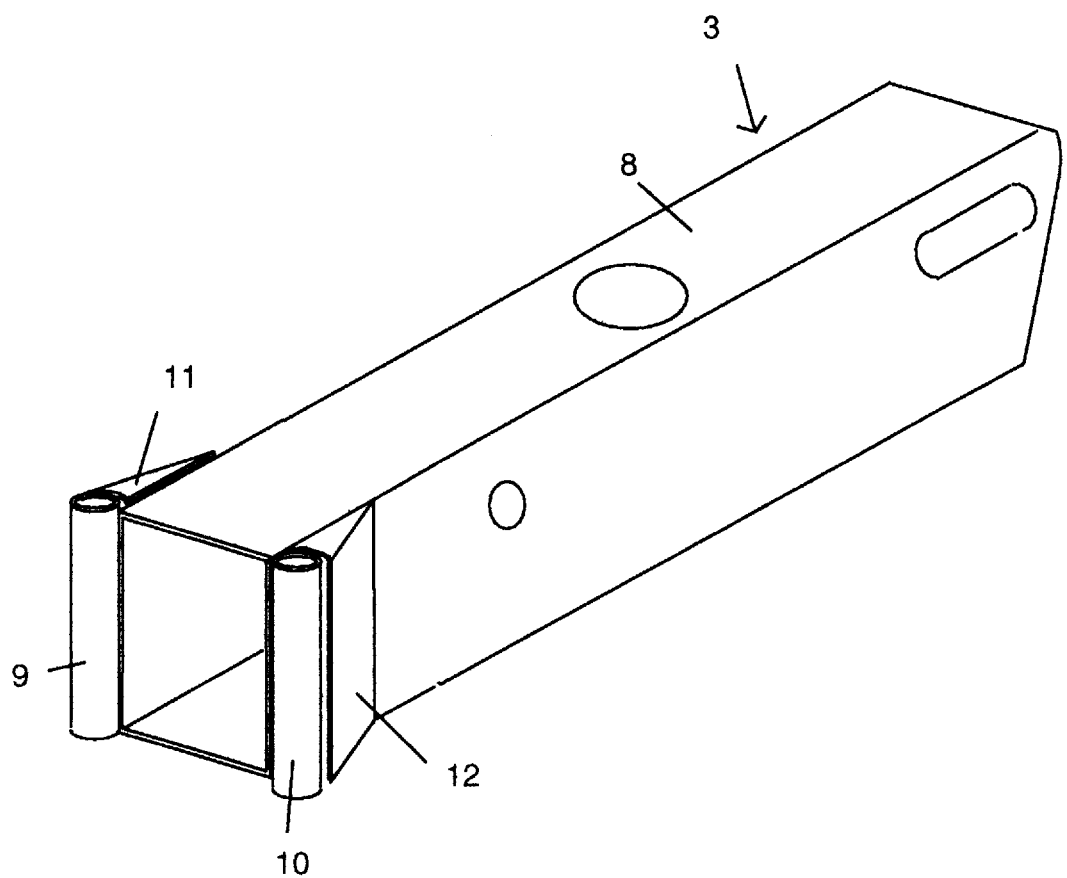
FIG. 3 Illustrates a perspective view of the swing-away hitch.

Construction of the invention is as follows. FIG. 3 shows a perspective view of the actuator cover 8. Two tubular sleeves with 1" outer diameter with 9/16" inner diameter are welded flush to the end of the cover on opposite sides to each other. The gussetts are formed to match the dimensions of the radius of the tube sleeves and are welded both to the sleeves 9, 10 and cover 8. The weld lines are grounded flush for a clean appearance.

Figure 4:
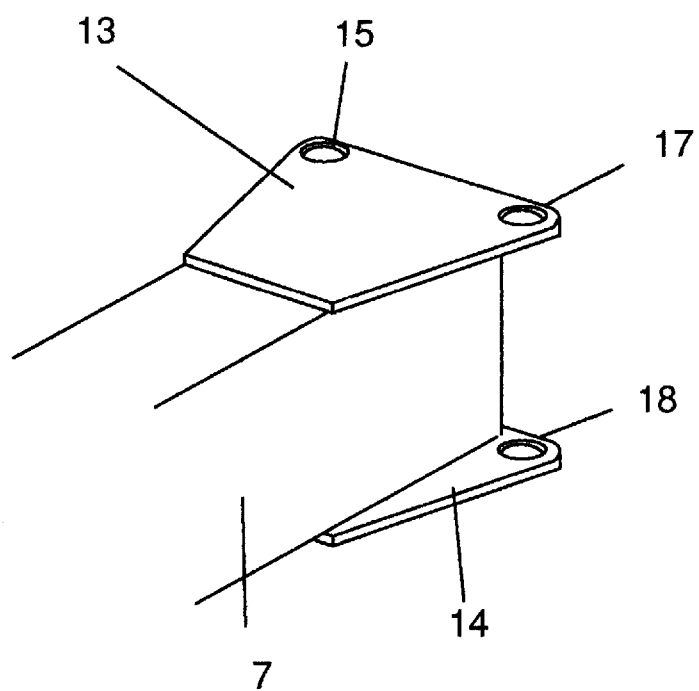
FIG. 4 Illustrates a perspective view of the mounted hitch assembly.

FIG. 4 shows a perspective of the swing-away hitch assembly. The plates 13, 14 are made using a 3/8" by 5" flatbar cut to a trapezoidal shape and holes 11/16" are punched or drilled at the leading corner's edge. For safety and asthetic reasons the corners of the plates are rounded. The main trailer tongue 7 is sandwiched between plates 13, 14 via a clamp (not shown) for a temporary hold. Plates 13, 14 protrudes 1½" beyond the tongue. In FIG. 1 the swing-away hitch 8 is supported between plates 13, 14 and is flush to the main trailer tongue 7. Once holes 15, 16, 17, 18 are aligned with the tubular sleeves 9, 10 the 5/8" pins 21, 22 are inserted and plates 13, 14 are welded to the main tongue 5. The clamp is then removed.

We claim:

1. A swing-away trailer coupler comprising: a pivoting arm having a front end adapted to be secured to a hitch, an actuator cover which covers said pivoting arm, wherein the actuator cover has a rear portion with a gusset and tubular sleeve inserts welded on opposite sides of the rear portion of the actuator cover, wherein a bolt is received in one of said tubular sleeve inserts and a removable pin is inserted in the other of said tubular sleeve inserts to facilitate positioning of said pivoting arm in either a towing or storage position.

\* \* \* \* \*